United States Patent
Harrington et al.

(10) Patent No.: US 11,644,322 B2
(45) Date of Patent: May 9, 2023

(54) UPDATING A PICK-UP OR DROP-OFF LOCATION FOR A PASSENGER OF AN AUTONOMOUS VEHICLE

(71) Applicant: GM Cruise Holdings LLC, San Francisco, CA (US)

(72) Inventors: Curt Harrington, San Francisco, CA (US); Wei Lu, San Bruno, CA (US); Devina Jain, San Francisco, CA (US); Kunal Mehta, San Francisco, CA (US); Nikola John Linn Noxon, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 37 days.

(21) Appl. No.: 17/171,390

(22) Filed: Feb. 9, 2021

(65) Prior Publication Data

US 2022/0252409 A1 Aug. 11, 2022

(51) Int. Cl.
*G01C 21/34* (2006.01)

(52) U.S. Cl.
CPC ....... *G01C 21/3438* (2013.01); *G01C 21/343* (2013.01); *G01C 21/3446* (2013.01); *G01C 21/3492* (2013.01)

(58) Field of Classification Search
CPC .............. G01C 21/3438; G01C 21/343; G01C 21/3446; G01C 21/3492
See application file for complete search history.

(56) References Cited

U.S. PATENT DOCUMENTS

| | | | |
|---|---|---|---|
| 9,562,785 B1* | 2/2017 | Racah | G06Q 10/06315 |
| 9,733,096 B2 | 8/2017 | Colijn et al. | |
| 10,372,129 B1 | 8/2019 | Urmson et al. | |
| 10,440,536 B2 | 10/2019 | Nemec et al. | |
| 10,685,416 B2 | 6/2020 | Tolkin et al. | |
| 10,838,428 B2 | 11/2020 | Bai et al. | |
| 2001/0056363 A1 | 12/2001 | Gantz et al. | |
| 2015/0377635 A1 | 12/2015 | Beaurepaire et al. | |
| 2018/0136656 A1 | 5/2018 | Rasmusson, Jr. et al. | |
| 2018/0202821 A1* | 7/2018 | Yu | G01C 21/3423 |
| 2018/0202822 A1* | 7/2018 | DeLizio | G01C 21/362 |
| 2019/0049264 A1* | 2/2019 | Malkes | G08G 1/096838 |
| 2019/0094037 A1* | 3/2019 | Jin | G01C 21/3697 |
| 2019/0129438 A1* | 5/2019 | Morita | G06V 20/56 |
| 2019/0228375 A1* | 7/2019 | Laury | G05D 1/0088 |
| 2020/0088531 A1* | 3/2020 | Kolambekar | G06Q 10/0631 |
| 2020/0103239 A1* | 4/2020 | Schwie | G08G 1/0141 |
| 2020/0191593 A1* | 6/2020 | Herman | G06Q 50/30 |
| 2020/0192385 A1* | 6/2020 | Fairfield | H04W 4/029 |
| 2021/0090025 A1* | 3/2021 | Bolton | G06Q 10/0837 |
| 2021/0108929 A1* | 4/2021 | Zhang | G01C 21/3438 |

(Continued)

*Primary Examiner* — Rami Khatib
(74) *Attorney, Agent, or Firm* — Calfee, Halter & Griswold LLP (57) ABSTRACT

An autonomous vehicle (AV) described herein is configured to receive a pull over location specified by a passenger, and is further configured to refine the pull over location based upon one or more factors, where the factors include computer-readable content from a profile of the passenger, sensor data output by sensor systems of the AV, observed or predicted weather conditions, observed or predicted traffic, and/or observations recently generated by other AVs that belong to the same fleet as the AV.

20 Claims, 7 Drawing Sheets

(56) References Cited

U.S. PATENT DOCUMENTS

2021/0350713 A1* 11/2021 Van Meeteren ........ H04W 4/40
2022/0205794 A1*  6/2022 Friedman ........... G01C 21/3605
2022/0221867 A1*  7/2022 Taveira ................ G06Q 50/265

* cited by examiner

UPDATING A PICK-UP OR DROP-OFF LOCATION FOR A PASSENGER OF AN AUTONOMOUS VEHICLE

BACKGROUND

An autonomous vehicle (AV) is a motorized vehicle that can navigate about roadways without a human driver. An exemplary AV includes a plurality of sensor systems, such as but not limited to a camera sensor system, a lidar sensor system, a radar sensor system, amongst others, where the AV navigates roadways based upon sensor signals output by the sensor systems. Specifically, the sensor signals are provided to a computing system of the AV, where the computing system is in communication with the plurality of sensor systems, and further where a processor of the computing system executes instructions based upon the sensor signals to control mechanical systems of the AV. These mechanical systems include a vehicle propulsion system, a braking system, and a steering system.

AVs are being developed to participate in ride sharing scenarios, where a passenger, through utilization of a mobile application installed on a mobile telephone, identifies a time, a pick-up location, and a drop-off location, where the time is when the AV is to pick-up the passenger, the pick-up location is the location where the AV is to pick-up the passenger, and the drop-off location is the location where the AV is to drop-off the passenger.

When picking up the passenger, the AV navigates towards the pick-up location as close to the time identified by the passenger as possible and pulls over at the pick-up location, whereupon the passenger enters the AV. Once the AV has picked up the passenger, the AV navigates towards the drop-off location and pulls over at the drop-off location, whereupon the passenger exits the AV. The AV then navigates away from the drop-off location to pick-up or drop-off another passenger. In urban environments, oftentimes the AV is unable to pull over at a specified pick-up or drop-off location, as there may be no suitable place for the AV to pull over, traffic conditions may prevent the AV from pulling over at the pick-up or drop-off location, etc. Conventionally, the AV navigates around a block, such that the AV again passes the pick-up or drop-off location; this process happens repeatedly until the AV is able to pull over, until the passenger cancels the ride, and/or until the passenger specifies a new pick-up or drop-off location. This conventional approach is inefficient in that to ensure that the passenger is picked up and dropped off at the desired time, the AV must arrive at the pick-up location early to allow for the possibility of the AV being unable to pull over at the pick-up location upon its initial arrival to the pick-up location. Therefore, when the AV is able to pull over at the pick-up location, the AV must sit idly until the passenger arrives at the specified time, effectively taking the AV out of service. If the AV does not arrive early to the pick-up location, there is a risk that the AV is unable to pull over at the pick-up location, making the passenger potentially late for an appointment.

SUMMARY

The following is a brief summary of subject matter that is described in greater detail herein. This summary is not intended to be limiting as to the scope of the claims.

Described herein are various technologies pertaining to autonomous vehicles (AVs) (e.g., level 5 AVs). More specifically, described herein are technologies pertaining to identifying pick-up and/or drop-off locations (pull over locations) where passengers are picked up by an AV or dropped off by the AV, where the pull over locations are identified based upon, for instance, information in a profile of the passenger, observations about the passenger ascertained by the AV based upon outputs of sensor systems of the AV, observations about an environment proximate to a proposed pull over location by another AV that is navigating roadways in a same region as the AV, current or predicted weather conditions, current or predicted traffic conditions, historical observations made by several AVs regarding successful and unsuccessful pull overs, calendar data for the passenger, etc.

In an example, a passenger, through use of a ridesharing application executing on a client computing device, identifies a time, a pick-up location, and a drop-off location. A server computing system receives such information from the client computing device of the passenger, identifies an AV that can fulfill the ride request, and transmits the time, the pick-location, and the drop-off location to the AV. In addition, the server computing system can transmit computer-readable content from a profile of the passenger to the AV, where the computer-readable content can include information about the passenger, such as age of the passenger, disabilities (if any) of the passenger, historical data about the passenger (e.g., whether the passenger is typically early when being picked up by AVs, whether the passenger is typically late when picked up by AVs, an amount of time required for the passenger to enter and exit AVs, preferences of the passenger when riding in AVs, and so forth). The AV additionally receives other information that may be germane to picking up and/or dropping off the passenger, such as a schedule of the passenger (e.g., times of meetings of the passenger), predicted and/or observed weather conditions at the pick-up location and the drop-off location, predicted and/or observed traffic conditions at the pick-up location and drop-off location, etc. Based upon at least some of the aforementioned information, the AV can refine pull over locations, thereby increasing probability of a successful pick-up of the passenger or drop-off of the passenger.

In a nonlimiting example, a passenger may request to be picked up at a first pull over location, and computer-readable content from the profile of the passenger can indicate that the passenger is healthy, enjoys walking, and dislikes being late to appointments. Based upon such computer-readable content, and further based upon historical data that indicates that it has previously been difficult to pick-up passengers proximate to the pull over location identified by the passenger, the AV can identify a new pull over location (e.g., where the new pull over location is a city block from the pull over location identified by the passenger). The AV identifies the new pull over location based upon the computer-readable content from the profile of the passenger that indicates that the passenger enjoys walking, is relatively healthy, and dislikes being late to appointments. The AV can cause a message to be transmitted to the client computing device of the passenger, where the message informs the passenger of the new pull over location and provides the passenger with the option of accepting or rejecting the new pull over location. When the passenger accepts the new pull over location, the AV navigates to the new pull over location rather than the pull over location previously identified by the passenger.

In another example, a passenger, through use of a ridesharing application executing on a client computing device, can identify a pull over location where an AV is to pick up the passenger. The autonomous vehicle is provided with the pull over location and is further provided with weather information that indicates that it is currently raining at the identified pull over location. Based upon a computer-readable map of a region that includes the pull over location, the AV can ascertain that a rain shelter is a block away from the identified pull over location. The AV causes a message to be transmitted to the passenger, where the message proposes an updated pull over location (proximate to the rain shelter), and further where the message may explain why the updated pull over location is being provided to the passenger (to allow the passenger to be sheltered while waiting for the AV). When the passenger accepts the updated pull over location, the AV navigates to the updated pull over location rather than the identified pull over location. In another example, the AV can sense micro-weather conditions and can update a pull over location based upon the micro-weather conditions. For instance, based upon sensor data output by at least one sensor system of the AV, the AV can detect a puddle at the original pull over location, and can select a new pull over location based upon the detected puddle being at the original pull over location.

It can be ascertained that based upon information that is available to the AV, the AV can identify pull over locations (pick-up and drop-off locations) for passengers that results in better experiences for the passengers (e.g., passengers are picked up on time, passengers arrive at their destinations on time, preferences of the passengers are accounted for, etc.). This is contrary to the conventional approach described above, where the AV may repeatedly pass by a predefined pull over location until the pull over location is unoccupied.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to refining a pull over location for an autonomous vehicle (AV) when picking up or dropping off a passenger are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

The terms "top side" and "bottom side" are used herein for identification purposes. It is contemplated that a sensor can be oriented in an autonomous vehicle in substantially any manner (e.g., a top side need not be above a bottom side when a sensor is in an autonomous vehicle).

Described herein are technologies relating to identifying pull over locations of an AV for picking up and/or dropping off passengers of the AV. When identifying an optimal pull over location for a passenger of the AV, the AV can identify such optimal pull over location based upon a pull over location provided by the passenger, information in a computer-readable profile of the passenger, sensor data output by a sensor system of the AV, historical data relating to picking up and/or dropping off passengers at different pull over locations, observed or predicted traffic information, observed or predicted weather information, etc. Based upon any suitable combination of such information, and further based upon a computer-readable map of a region, the AV selects pull over locations (pick-up and drop-off locations) for the passenger. This is advantageous compared to conventional approaches for identifying pull over locations, as conventional approaches for identifying locations to pick-up and drop-off passengers of an AV are limited to information explicitly provided by passengers.

Figure 1:
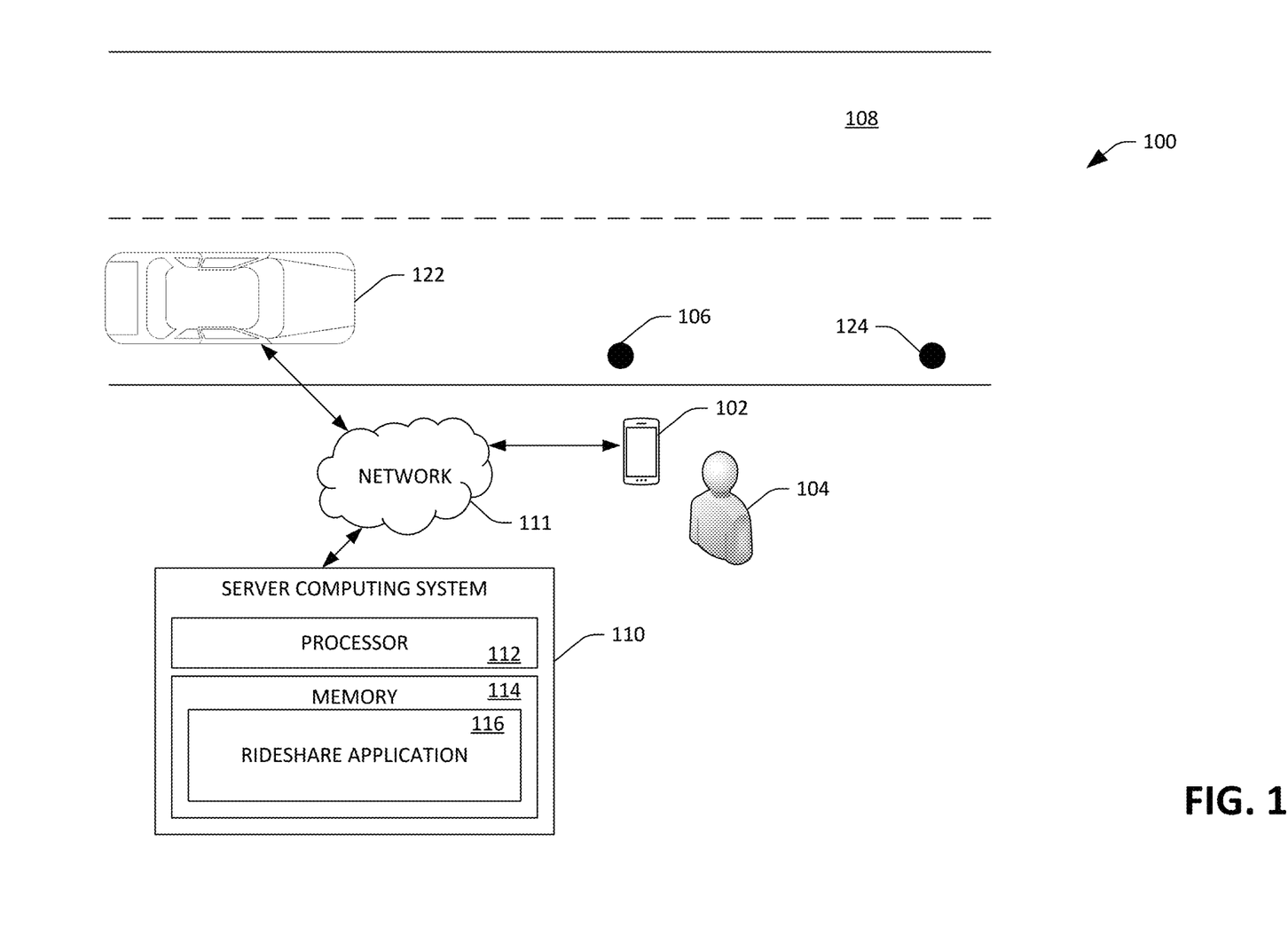
FIG. 1 is a schematic that illustrates an autonomous vehicle (AV) refining a pull over location identified by a passenger.

With reference now to FIG. 1, a schematic 100 illustrating an identification of a pull over location by an AV is depicted. In the schematic 100, a mobile telephone 102 is employed by a passenger 104 to request that an AV pick up the passenger 104 at a first pull over location 106 along a side of a roadway 108. For instance, the mobile telephone 102 may have a ridesharing application installed thereon, where the ridesharing application installed on the mobile telephone 102 is configured to transmit a ride request to a server computing system 110 by way of a network 111. The ride request transmitted from the mobile telephone 102 to the server computing system 110 includes an identity of the first pull over location 106, a time when the passenger 104 desires to be picked up at the first pull over location 106 by an AV, and a destination location. For instance, to identify the first pull over location 106, the passenger 104 may specify a street address, may indicate that the first pull over location 106 is his or her current location, etc.

The server computing system 110 includes a processor 112 and memory 114, where the memory 114 has a rideshare application 116 loaded therein. The rideshare application 116 is configured to receive ride requests from numerous passengers and coordinate the ride requests with a fleet of AVs navigating about roadways in a region (such as a city, a sector of a city, etc.). The rideshare application 116 maintains profiles for passengers, including a profile for the passenger 104, wherein the profile includes information pertaining to the passenger 104 that is germane to travelling in AVs. The profile for the passenger 104 can include, but is not limited to including, an age of the passenger 104, a gender of the passenger 104, disabilities (if any) of the passenger 104, riding preferences of the passenger 104 (e.g., an identity of a side of an AV where the passenger 104 prefers to ride, an indication that the passenger 104 prefers to face a direction when travelling (i.e., forward or backward), an indication as to whether the passenger 104 is willing to enter or exit an AV when the AV is double parked), a distance that the passenger 104 is willing to walk to meet an AV, a distance that the passenger 104 is willing to walk to a destination from the AV, amongst other information.

The ridesharing application 116 selects an AV 122 from the fleet of AVs and assigns initial pull over locations (a pick-up location and a drop-off location) to the AV 122 based upon the ride request received from the mobile telephone 102. The initial pull over locations assigned to the AV 122 include the first pull over location 106.

With more specificity, the AV 122 is in communication with the server computing system 110 by way of the network 111, and the rideshare application 116 causes the server computing system 110 to transmit ride instructions to the AV 122 by way of the network 111, where the ride instructions include, for example, the first pull over location 106 specified by the passenger 104, a time that the AV 122 is to pick-up the passenger 104 at the first pull over location 106, and a drop-off location specified by the passenger 104. The ridesharing application 116 can also cause the server computing system 110 to transmit at least a portion of the profile for the passenger 104 to the AV 122. Based upon the ride instructions received from the server computing system 110, the AV 122 autonomously navigates towards the first pull over location 106 to pick up the passenger 104 at the time specified by the passenger 104 in the ride request.

As will be described in greater detail herein, the AV 122, while traveling towards the first pull over location 106, identifies a second pull over location 124 that is determined by the AV 122 to be advantageous over the first pull over location 106 for the passenger 104. The AV 122 identifies the second pull over location 124 based upon computer-readable data from the profile of the passenger 104 and further based upon sensor signals output by one or more sensor systems of the AV 122. In a nonlimiting example, the profile of the passenger 104 can indicate that the passenger 104 is elderly and unable to walk great distances. The AV 122 can further receive location information generated by the mobile telephone 102 of the passenger 104, wherein the location information indicates that the distance between the passenger 104 and the second pull over location 124 is less than the distance between the passenger 104 and the first pull over location 106. Therefore, based upon the computer-readable profile of the passenger 104 and the known location of the passenger 104, the AV 122 can identify that it is advantageous to pick-up the passenger 104 at the second pull over location 124 over the first pull over location 106 due to the second pull over location 124 being the shortest distance between the current location of the passenger 104 and positions where the AV 122 is able to pick-up the passenger 104.

In another example, the AV 122, based upon sensor signals output by sensor systems of the AV 122, can ascertain that it is unable to pull over at the first pull over location 106 (e.g., because of current traffic conditions, because of another vehicle being parked at the first pull over location 106, etc.), and can further ascertain that the AV 122 is able to pull over at the second pull over location 124. Further, the computer-readable content of the profile of the passenger 104 can indicate that the passenger 104 is relatively healthy and enjoys walking. Thus, the AV 122 can cause a message to be transmitted to the mobile telephone 102 of the passenger 104, wherein the message indicates that the AV 122 is able to pick-up the passenger 104 at the second pull over location 124 at the time specified by the passenger 104 in the ride request. As will be described in greater detail below by way of examples, the AV 122 can analyze different types of data when refining the pull over location for the passenger 104 from the first pull over location 106 to the second pull over location 124.

Figure 2:
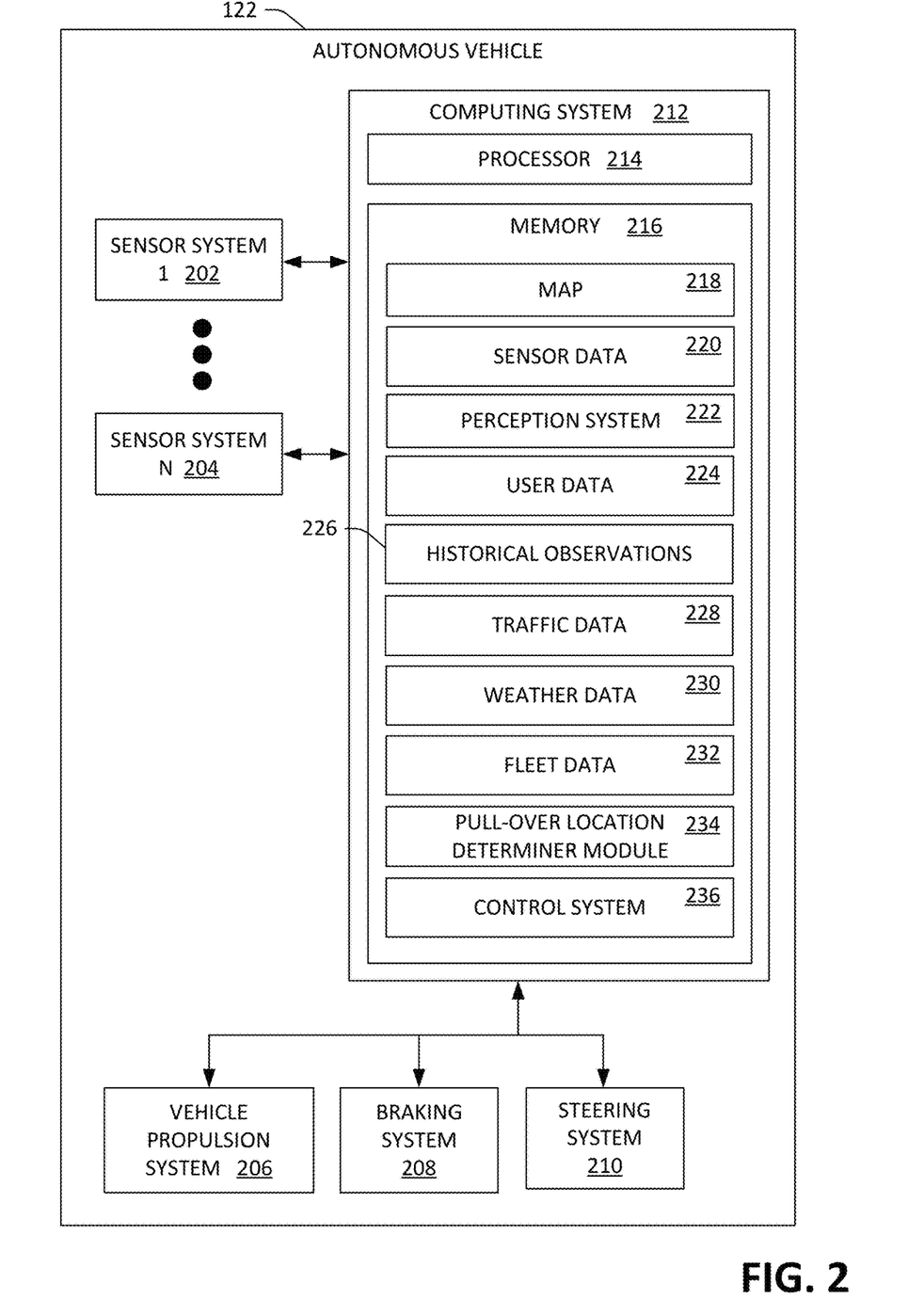
FIG. 2 is a functional block diagram of an AV that illustrates componentry of the AV.

With reference now to FIG. 2, a functional block diagram of the AV 122 is illustrated. The AV 122 includes a plurality of sensor systems 202-204, where the sensor systems 202-204 can include a lidar sensor system, a radar sensor system, a sonar sensor system, a global positioning system (GPS), an inertial sensor system, etc. The AV 122 further includes several mechanical systems 206-210, where the mechanical systems comprise a vehicle propulsion system 206, a braking system 208, and a steering system 210. The vehicle propulsion system 206, in an example, includes an electric motor. In another example, the vehicle propulsion system 206 includes a combustion engine. The braking system 208 is configured to decelerate the AV 122, and the steering system 210 is configured to control direction of movement of the AV 122.

The autonomous vehicle 122 also includes a computing system 212 that is in communication with the sensor systems 202-204 and the mechanical systems 206-210. Generally, the computing system 212 is configured to receive sensor signals output by the sensor systems 202-204 and control the mechanical systems 206-210 based upon the sensor signals such that the AV 122 autonomously navigates roadways.

The computing system 212 includes a processor 214 and memory 216, where the memory 216 has loaded therein data that is accessed by the processor 214 and instructions that are executed by the processor 214.

As illustrated, the memory 216 has a map 218 of a region loaded therein. The map 218 is a three-dimensional map that can identify locations of roadways, locations of sidewalks, locations of inanimate objects such as telephone poles, traffic lights, drain grates, sewer caps, potholes, buildings, traffic signs, curbs of roadways, heights of the curbs, rain shelters, concrete medians, trees, bushes, fences, etc. The computing system 212 localizes the AV 122 in the region represented by the map 218 based upon one or more sensor signals output by one or more of the sensor systems 202-204 and the map 218.

The memory 216 further has sensor data 220 stored therein, where the sensor data 220 is extracted from sensor signals output by the sensor systems 202-204 over some window of time (e.g., the most recent 5 seconds). Therefore, the sensor data 220 may include lidar scans, radar scans, images generated by camera systems, and the like.

The memory 216 further has a perception system 222 loaded therein, where the perception system 222 is configured to identify objects in proximity to the AV 122 based upon the sensor data 220. The perception system 222 is further configured to track identified objects over time. Therefore, for instance, the perception system 222 can differentiate between pedestrians, bicyclists, and vehicles, and can track such pedestrians, bicycles, and vehicles over time as the AV 122 navigates about roadways in the region represented by the map 218.

The memory 216 also has user data 224 loaded therein, where the user data 224 includes computer-readable content from the profile of the passenger 104. Therefore, the user data 224 may include demographic information of the passenger 104, such as age of the passenger 104, gender of the passenger 104, disabilities (if any) of the passenger 104, preferences of the passenger 104 with respect to riding in AVs, ratings set forth by the passenger 104 with respect to one or more pick-ups and/or drop-offs, times that the passenger 104 has been picked up and dropped off by AVs, locations where the passenger 104 has been picked up and dropped off by AVs, an average amount of time required for the passenger 104 to enter an AV once the AV has reached a pull over location, an average amount of time required for the passenger 104 to exit an AV once the AV has reached a destination, etc. Still further, the user data 224 may include calendar data for the passenger 104, such as scheduled meetings of the passenger 104, locations, times, and identities of events that the passenger 104 is planning to attend (such as a concert, a sporting event, a film, etc.), amongst other user data.

The memory 216 may also have historical observations 226 loaded therein, where the historical observations 226 include observations about pull over locations generated by AVs based upon sensor data emitted by sensor systems of the AVs. For instance, for a particular time of day and day of week, the historical observations 226 can indicate that a first pull over location is a desirable pull over location due to lack of traffic near the first pull over location at the time of day and day of week. Contrarily, the historical observations 226 can indicate that a second pull over location is an undesirable pull over location at the time of day and the day of the week due to traffic congestion that is typical at the second pull over location.

The memory 216 may also include traffic data 228, where the traffic data 228 is indicative of current or predicted traffic conditions in a region, including at the pull over locations specified by the passenger 104 in the ride request and along potential travel routes between pull over locations. The traffic data 228 may be received from the server computing system 110, from a traffic service that can be accessed by the computing system 212, etc.

The memory 216 can also comprise weather data 230 that is indicative of current or predicted weather conditions in a region, including at the pull over locations specified by the passenger 104 in the ride request. Thus, the weather data 230 may indicate that it is currently raining at the first pull over location 106 specified by the passenger 104 in the ride request. The weather data 230 may be received from the server computing system 110, can be generated based upon at least a portion of the sensor data 220 (e.g., an image generated by a camera may indicate that it is foggy, that it is rainy, etc.). In another example, the weather data 230 can be received from a weather service that is accessible to the computing system 212. The weather data 230 can include micro weather data (e.g., there is a puddle at a pull over location as determined by the AV 122 based upon sensor data, there is a sheet of ice at the pull over location, there is fog at the pull over location, etc.) as well as macro weather data (e.g., it is raining in a city, the temperature is relatively high, etc.).

Further, the memory 218 may include fleet data 232, where the fleet data 232 includes information generated by other AVs in a fleet with the AV 122, where the other AVs are in the communication with the server computing system 110. As indicated previously, several AVs may belong to the fleet, and may navigate about roadways in a city in connection with providing a ridesharing service. For instance, there may be tens to hundreds of AVs navigating about a particular city. These AVs generate sensor data and make observations as they navigate about roadways in the city; the AVs can transmit such observations to the server computing system 110, which in turn can transmit relevant observations to other AVs in the fleet. Thus, the fleet data 232 can indicate that a particular location along a roadway in the city is currently a good pull over location, as there are no other vehicles currently parked in the particular location. In another example, the fleet data 232 can indicate that a particular section of roadway is an undesirable pull over location, as such section of roadway is under construction.

The memory 216 also includes a pull over location determiner module 234 that identifies advantageous pull over locations for the AV 122 with respect to the passenger 104 based upon the pull over locations identified by the passenger 104 in the ride request and any suitable combination of the sensor data 220, the user data 224, the historical observations 226, the traffic data 228, the weather data 230, and the fleet data 232. Pursuant to an example, the pull over location determiner module 234 can include a cost function that is repeatedly executed by the processor 214 as new data is generated by the sensor systems 202-204 and/or received from the server computing system 110 or other suitable services. Inputs to the cost function include one or more of: 1) observations output by the perception system 222 based upon the sensor data 220; 2) the user data 224; 3) the historic observations 226; 4) the traffic data 228; 5) the weather data 230; or 6) the fleet data 232. The cost function of the pull over location determiner module 234 is configured to identify a pull over location that minimizes loss, where loss for an identified pull over location may increase as distance from the first pull over location 106 increases, where loss may increase as the estimated time of arrival at the identified pull over location extends beyond the time specified in the ride request, where loss may increase as the passenger 104 has to walk further from his or her current location to the identified pull over location, where loss may increase when the identified pull over location causes the passenger 104 to be exposed to undesirable weather conditions (and conversely loss may decrease when the identified pull over location shields the passenger 104 from undesirable weather conditions), where loss may be a function of observed or estimated traffic congestion at the identified pull over location, etc.

In another example, the pull over location determiner module 234 may be or include a deep neural network (DNN) that is trained based upon observations generated over time regarding pick-ups and drop-offs of passengers, where such observations may include: feedback provided by the passengers as to whether the pick-up or drop-off was deemed successful by the passengers; weather conditions at the pick-ups and drop-offs, traffic conditions at the pick-ups and the drop-offs, amount of walking required of the passengers prior to the pick-ups and after the drop-offs, etc. Given such observations, the DNN can be trained to identify relationships between passenger satisfaction with pull overs, locations of the pull overs, and data pertaining to the pull overs.

The computing system 212 also includes a control system 236 that controls the mechanical systems 206-210 based upon output of the pull over location determiner module 234. For instance, the pull over location determiner module 234 can identify the second pull over location 124 as the location where the AV 122 is to pick-up the passenger 104, and the control system 236 can control the vehicle propulsion system 206, the braking system 208, and/or the steering system 210 to cause the AV 122 to autonomously navigate to the second pull over location 124 rather than the first pull over location 106 specified by the passenger 104 in the ride request.

Figure 3:
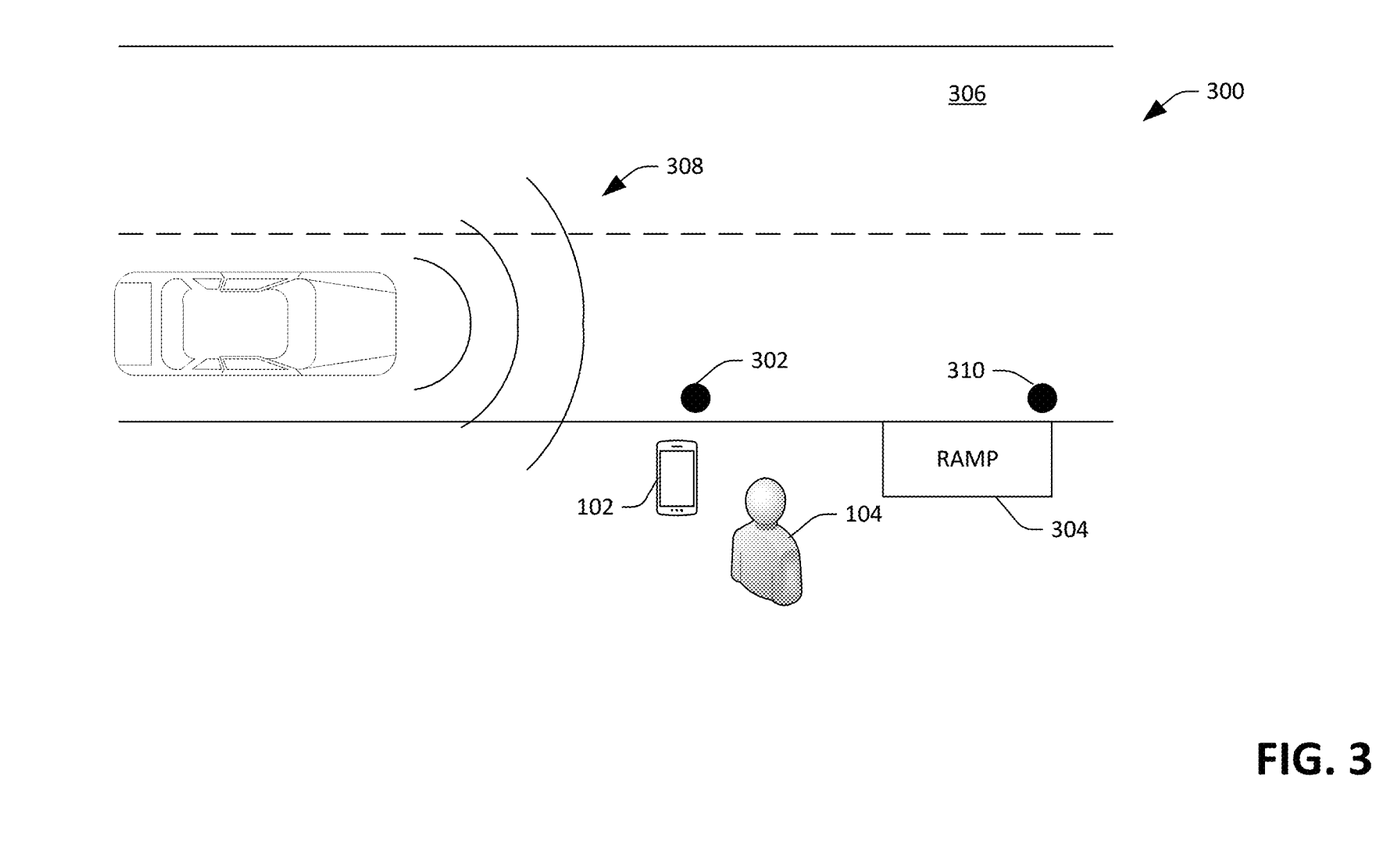
FIG. 3 is a schematic that illustrates an AV refining a pull over location for a passenger based upon information in a profile of the passenger and a map of a region where the AV is to pull over.

With reference now to FIG. 3, a schematic 300 that depicts the AV 122 identifying a pull over location for picking up the passenger 104 is illustrated. In the example depicted in FIG. 3, the passenger 104 operates the mobile telephone 102 to submit a ride request to the server computing system 110. The server computing system 110 receives the ride request, where the ride request identifies a first pull over location 302 and a time when an AV is to pick-up the passenger 104 at the first pull over location 302. The server computing system 110 identifies the AV 122 as being capable of fulfilling the ride request of the passenger 104 and transmits ride instructions to the AV 122. The AV 122 navigates towards the first pull over location 302 at an appropriate time based upon the ride request.

In an example, the user data 224 for the passenger 104 indicates that the passenger 104 is elderly. Further, the map 218 indicates that if the AV 122 were to pick-up the passenger 104 at the first pull over location 106, the passenger 104 will be required to step across a relatively large curb to enter the AV 122. The map 218 can further indicate that a ramp 304 exists somewhat close to the first pull over location 302. Additionally, as the AV 122 travels along a roadway 306 towards the first pull over location 302, sensor signals (represented by curved lines 308) output by one or more of the sensor systems 202-204 may indicate that the passenger 104 is using a cane, thereby increasing the risk that the passenger 104 may fall and become injured when stepping over the curb. Based upon such information, the AV 122 identifies a second pull over location 310 that is proximate to the ramp 304, such that if the AV 122 were to pull over at the second pull over location 310, the passenger can enter the AV 122 by way of the ramp 304 instead of being forced to step over the curb.

In an example, when the distance between the first pull over location 302 and the second pull over location 310 is beneath a threshold (e.g., 30 meters, 40 meters, 50 meters, etc.), the AV 122 can navigate directly to the second pull over location 310 instead of the first pull over location 302. When, however, the distance between the pull over locations 302 and 310 is above the threshold, the AV 122 can cause a message to be transmitted to the mobile telephone 102 of the passenger 104, where the message requests that the passenger 104 walk to the second pull over location 310. In an embodiment, the message can request permission for the AV 122 to navigate to the second pull over location 310, and the passenger 104 can approve or deny the request. The AV 122 navigates to one of the first pull over location 302 or the second pull over location 310 depending upon the response of the passenger 104 to the request. In the example illustrated in FIG. 3, the AV 122 identifies that the second pull over location 310 is advantageous over the first pull over location 302 based upon the user data 224, the map 218, and the sensor data 220.

Figure 4:
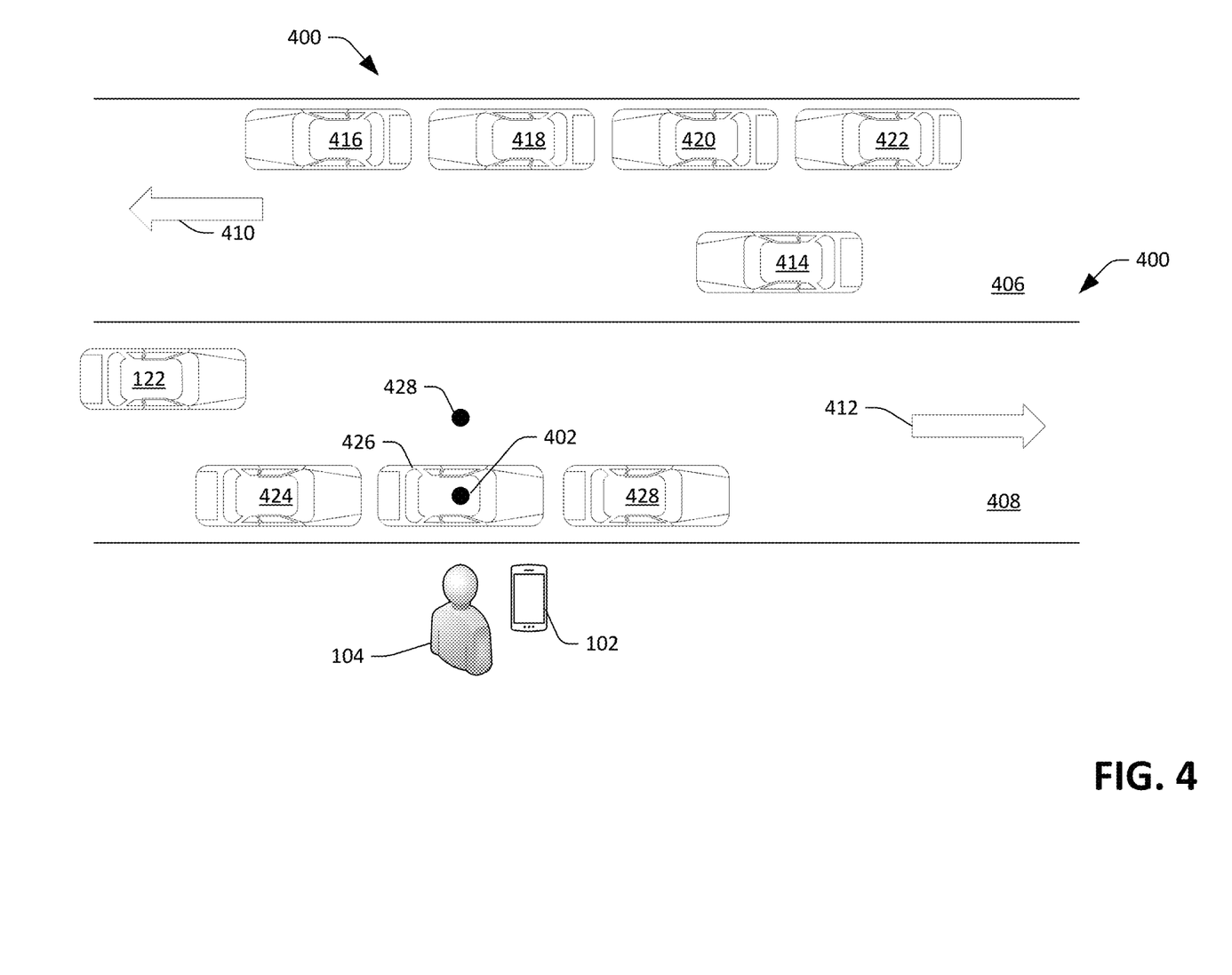
FIG. 4 is a schematic that illustrates an AV refining a pull over location for a passenger based upon information in a profile of the passenger and observations made by the AV pertaining to the pull over location.

Referring now to FIG. 4, a schematic 400 that depicts the AV 122 refining a pull over location in another scenario is illustrated. In the scenario depicted in FIG. 4, the passenger 104 has submitted a ride request to the rideshare application 116, where the ride request identifies a first pull over location 402 on a roadway 404. The roadway 404 includes two lanes: a first lane 406 and a second lane 408, where traffic flows in a first direction (as illustrated by arrow 410) in the first lane 406 and where traffic flows in a second direction (opposite the first direction, as illustrated by arrow 412) in the second lane 408. The first lane 406 and the second lane 408 are sufficiently wide such that vehicles can park along the sides of the roadway 404 while still allowing one lane of traffic to travel in the lanes 406 and 408. Thus, in an example, in the first lane 406 of the roadway 404, a vehicle 414 travels in the first direction on a first side of the first lane 406 while several vehicles 416-422 are parked along a second side of the first lane 406. Similarly, several vehicles 424-428 are parked along a first side of the second lane 408.

In the exemplary schematic 400, the vehicle 426 is parked at the first pull over location 402 identified by the passenger 104 in the ride request; hence, the AV 122 is unable to navigate to the first side of the second lane 408 to pick-up the passenger 104 at the first pull over location 402. Pursuant to an example, the user data 224 indicates that the passenger 104 has no disabilities, and further indicates that the passenger 104 tends to enter AVs fairly quickly. In addition, the traffic data 228 can indicate that there is currently a relatively small amount of traffic on the roadway 404, and the sensor data 220 can indicate that there are no vehicles currently travelling behind the AV 122. Based upon such information, the AV 122 identifies a second pull over location 428, wherein when the AV 122 ceases movement at the second pull over location 428, the AV 122 is in a double-parked condition. Nevertheless, due to the lack of traffic, and the knowledge that the passenger 104 will quickly enter the AV 122, the AV 122 can ascertain that the second pull over location 428 is advantageous for the passenger 104 over the first pull over location 402, as the AV 122 would need to travel past the first pull over location 402 and navigate a circuitous route to return to the first pull over location 402, thereby extending the time. Therefore, in this example, the AV 122 can employ the map 218, the sensor data 220, the user data 224, and the traffic data 228 in connection with refining the pull over location to pick-up the passenger 104.

Figure 5:
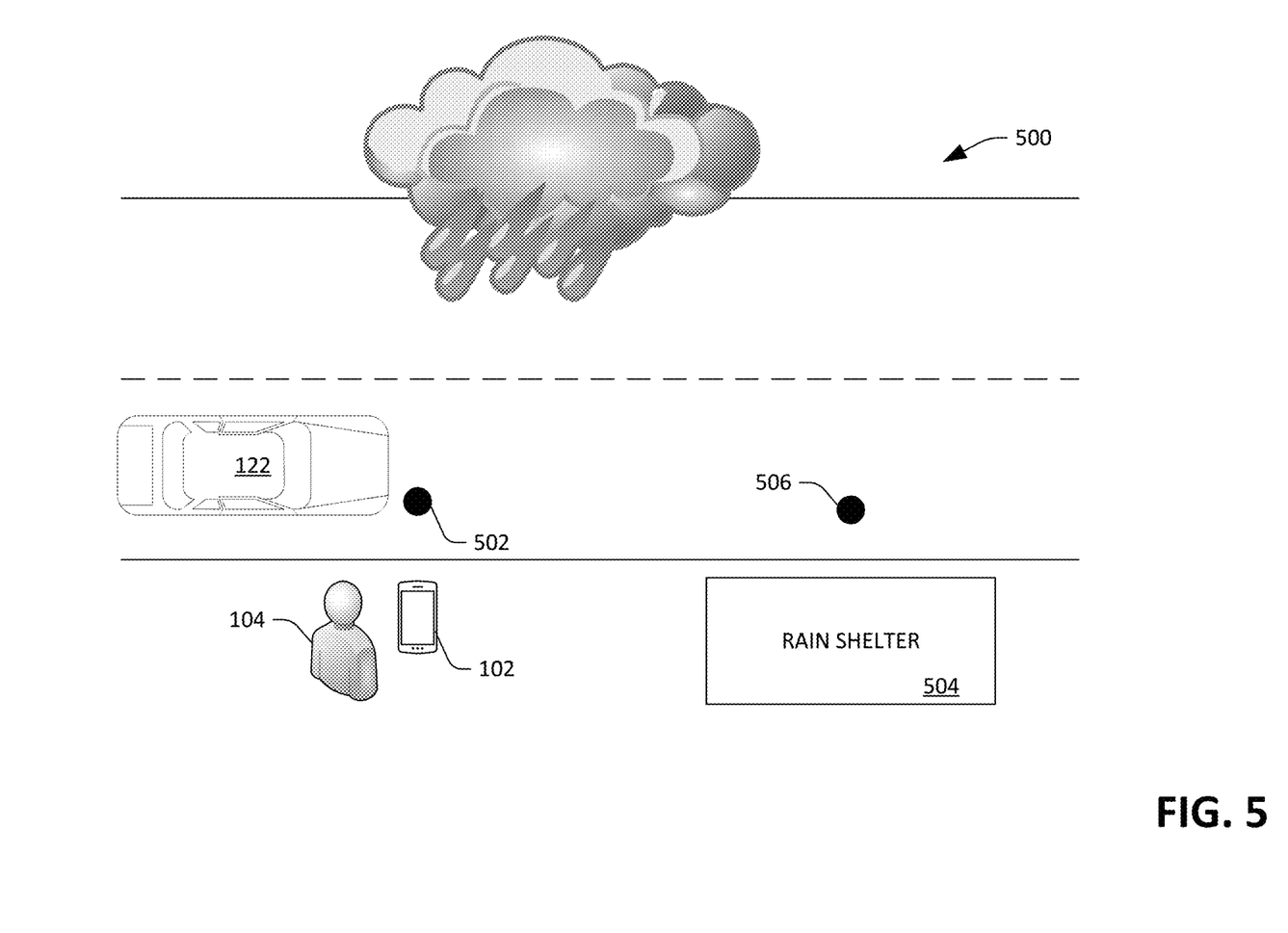
FIG. 5 is a schematic that illustrates an AV refining a pull over location for a passenger based upon observed and/or predicted weather conditions at the pull over location.

FIG. 5 is another schematic 500 that depicts the AV 122 identifying a pull over location that is different from the pull over location specified by the passenger 104 in a ride request. With respect to the example depicted in the schematic 500, it is raining at a first pull over location 502 specified by the passenger 104 in the ride request. The AV 122 can ascertain from the map 218 that a rain shelter 504 is somewhat close to the first pull over location 502 and/or somewhat close to a current location of the passenger 104. The user data 224 can indicate that inclement weather bothers the passenger 104, and the passenger 104 enjoys walking. Based upon such information, the AV 122 can identify a second pull over location 506 that is proximate to the rain shelter 504, such that the passenger 104 will be sheltered from the rain while awaiting arrival of the AV 122. Upon identifying the second pull over location 506, the AV 122 can cause a message to be transmitted to the mobile telephone 102 of the passenger 104, where the message instructs the passenger 104 to walk to the rain shelter 504 and await the arrival of the AV 122. In such an example, the AV 122 identifies the second location 506 through use of the map 218, the user data 224, (optionally) the sensor data 220 (to confirm that it is raining), and the weather data 230. Still further, the historical observations 226 may indicate that the second pull over location 506 has historically been associated with successful passenger pick-ups, thus reducing loss associated with the second pull over location 506.

In another example, as the AV 122 approaches the first pull over location 502, the AV 122 can determine (based upon sensor systems output by at least one of the sensor systems 202-204) that a large puddle exists at the first pull over location 502, and thus the passenger 104 would be forced to either jump over the puddle or step in the puddle when entering the AV 122 at the first pull over location 502. Based upon such determination, the AV 122 can identify the second pull over location 506 as being advantageous over the first pull over location 502, as there is no puddle at the second pull over location 506.

Figure 6:
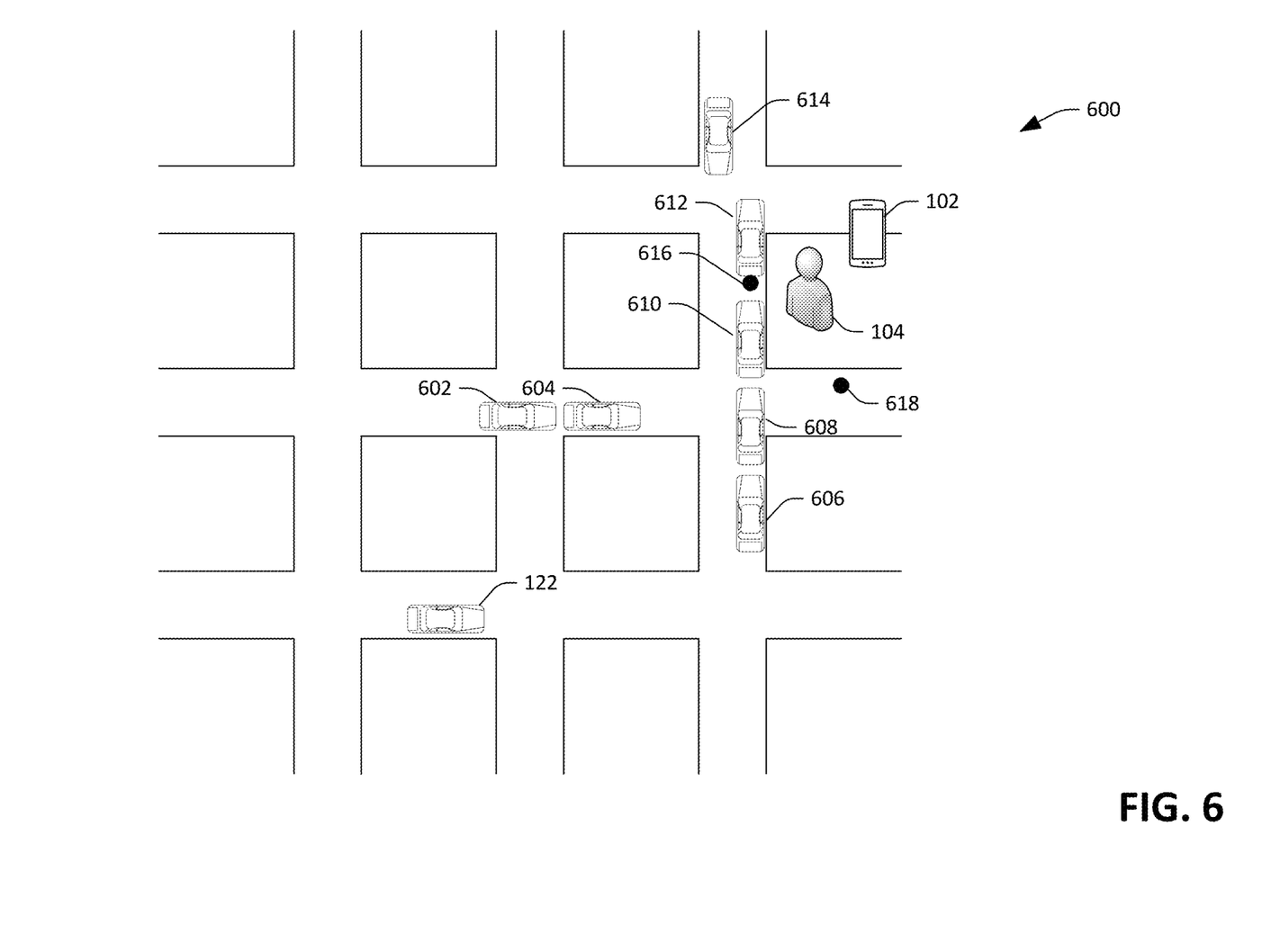
FIG. 6 is a schematic that illustrates an AV refining a pull over location for a passenger based upon an observation about the pull over location, where the observation is generated by another AV.

Referring now to FIG. 6, yet another schematic 600 that depicts the AV 122 suggesting a pull over location for the passenger 104 is illustrated. Several vehicles 602-614 are illustrated in the schematic 600 in addition to the AV 122, where the vehicles 602-614 and the AV 122 are parked or moving about roadways in a region. In an example, the vehicles 604 and 614 may be AVs that belong to the same fleet as the AV 122. The passenger 104, as described previously, issues a ride request to the rideshare application 116 by way of the mobile telephone 102, where the ride request identifies a first pull over location 616. The server computing system 110 identifies the AV 122 as being able to fulfill the ride request (e.g., the AV 122 is not full of passengers and it is estimated that the AV 122 can reach the first pull over location 616 at or prior to the time specified by the passenger 104). The AVs 604 and 614, based upon sensor data generated by sensor systems of the AVs 604 and 614, have generated observations that indicate that the first pull over location 616 is sub-optimal, as the vehicles 610 and 612 are parked along the side of the road, thereby preventing the AV 122 from being able to pull over to pick up the passenger 104. The AV 604 may further output an observation to the server computing system 110 that there is little traffic on a roadway that intersects the roadway that includes the first pull over location 616. Therefore, based upon the fleet data 232 (and optionally the user data 224, traffic data 224, etc.), the AV 122 can identify a second pull over location 618 that is advantageous over (e.g., has lower cost) the first pull over location 616.

The examples set forth with respect to FIGS. 3-6 refer to pick-up of the passenger 104; it is to be understood that the AV 122 can undertake similar analyses when identifying pull over locations for dropping off the passenger 104. Features that may impact cost of an identified pull over location include arrival time at the identified pull over location, distance between the identified pull over location and the pull over location specified by the passenger 104, events in a calendar of a user (e.g., cost increases if the identified pull over location is associated with the passenger 104 being late to a meeting or event), lighting at the pull over location (e.g., cost increases at night with respect to a poorly lit pull over location), number of pedestrians at the pull over location (e.g., the larger the number of pedestrians, the lower the cost), amongst others.

Still further, the AV 122 can select a pull over location when picking up a passenger based upon real-time data output by the mobile telephone 102 of the passenger, including geolocation data from a GPS sensor, a short-range wireless signal, etc. For instance, the AV 122 can identify a pull over location for the passenger 104 based upon a detected direction of movement of the passenger 104, a detected velocity of the passenger 104, and so forth.

Figure 7:
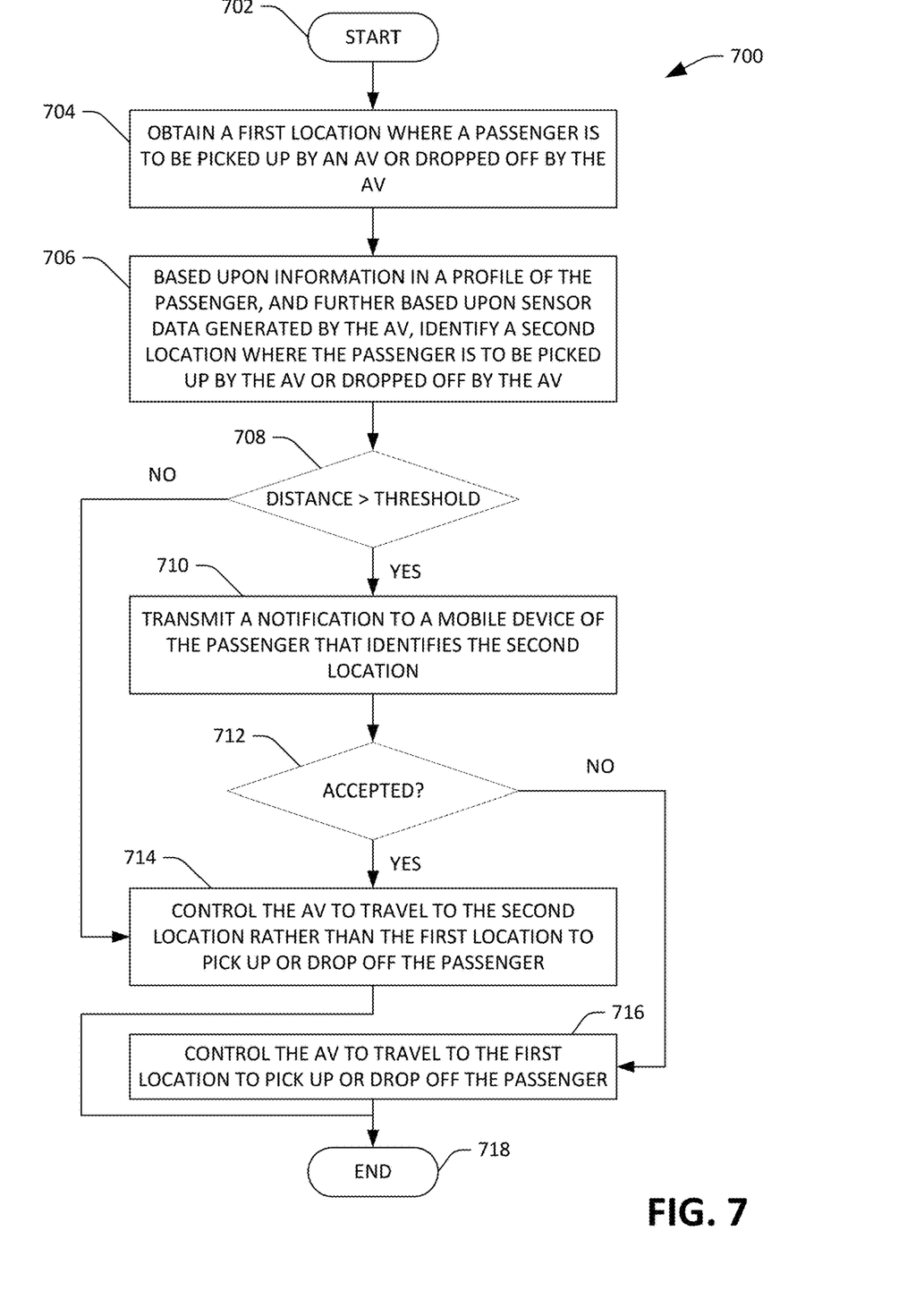
FIG. 7 is a flow diagram illustrating an exemplary methodology for identifying a refined pull over location for a passenger based upon information in a profile of the passenger and further based upon sensor data generated by an AV.

FIG. 7 illustrates a methodology 700 relating to identifying a pull over location for a passenger of an AV. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

The methodology 700 starts at 702, and at 704 a first location is obtained, wherein the first location is where a passenger is to be picked up by an AV or dropped off by the AV. For instance, the passenger may specify the first location.

At 706, based upon information in a profile of the passenger, and further based upon sensor data generated by sensor systems of the AV, a second location where the passenger is to be picked up by the AV or dropped off by the AV is identified, where the second location is different from the first location.

At 708, a determination is made as to whether a distance between the first location and the second location is greater than a predefined threshold. When the distance between the first location the second location to is greater than the threshold, then at 710 a notification is transmitted to a mobile device of the passenger, where the notification identifies the second location. The passenger may then be given the option to accept the second location as the pick-up or drop-off location or reject the second location as the pick-up or drop-off location.

At 712, a determination is made as to whether the passenger accepted or rejected the second location as the pick-up or drop-off location. When it is determined at 712 that the passenger accepted the second location as the pick-up or drop-off location, then at 714 the AV autonomously travels to the second location rather than the first location to pick-up or drop off the passenger. When it is determined at 708 that the distance between the first location the second location is not greater than the threshold, the methodology 700 proceeds to 714 where the AV autonomously travels to the second location rather than the first location to pick up or drop off the passenger. When it is determined at 712 that the passenger has not accepted the second location as the pick-up or drop-off location, the methodology 700 proceeds to 716, where the AV autonomously travels to the first location to pick up or drop-off the passenger. After the AV has travelled to the second location at 714 or after the AV has travelled to the first location at 716, the methodology 700 completes at 718.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle (AV) comprising:
   a sensor that is configured to output a sensor signal, wherein the sensor signal is indicative of locations of objects in an environment of the AV;
   a processor that is in communication with the sensor; and memory storing:
      computer-readable content included in a profile of a passenger; and
      instructions that, when executed by the processor, cause the processor to perform acts comprising:
         receiving a first location that identifies where the AV is to temporarily cease moving in order for the passenger to enter the AV or for the passenger to exit the AV;
         subsequent to receiving the first location and at a first time, receiving an observation about the first location generated by a second AV when the second AV travelled past the first location, where the second AV generated the observation at a second time that is prior to the first time, where the second time is within a predefined threshold amount of time from the first time, and further where the observation indicates that the first location will be undesirable to pick up or drop off a passenger at a scheduled pickup or drop off time;
         based upon the computer-readable content included in the profile of the passenger, the sensor signal output by the sensor, and the observation about the first location generated by the second AV, identifying a second location that is different from the first location;
         controlling the AV to travel to the second location rather than the first location and stop at the second location in order for the passenger to enter the AV or for the passenger to exit the AV;
         detecting that the passenger has entered the AV or exited the AV; and
         upon detecting that the passenger has entered the AV or exited the AV, controlling the AV to move away from the second location.

2. The AV of claim 1, wherein the second location is identified based further upon traffic data that is indicative of current or predicted traffic at the first location and the second location.

3. The AV of claim 2, wherein the second location is identified based further upon weather data that is indicative of current or predicted weather at the first location and the second location.

4. The AV of claim 3, wherein the second location is identified based further upon historical successes and failures of passenger pick-ups and drop-offs at the first location and the second location.

5. The AV of claim 4, wherein a cost function is employed to identify the second location, and further wherein a loss contemplated in the cost function is based upon a distance between the first location and the second location.

6. The AV of claim 1, wherein the computer-readable content comprises an age of the passenger.

7. The AV of claim 1, wherein the second location corresponds to the AV being in a double-parked condition.

8. A method performed by an autonomous vehicle (AV) in connection with identifying a pull over location, the method comprising:
   receiving a first location that identifies where the AV is to temporarily cease moving in order for a passenger to enter the AV or for the passenger to exit the AV, wherein the first location is specified in a ride request for the passenger;
   subsequent to receiving the first location and at a first time, receiving an observation about the first location generated by a second AV when the second AV travelled past the first location, where the second AV generated the observation at a second time that is prior to the first time, where the second time is within a predefined threshold amount of time from the first time, and further where the observation indicates that the first location will be undesirable to pick up or drop off a passenger at a scheduled pickup or drop off time;
   based upon computer-readable content included in a profile of the passenger, a sensor signal output by a sensor system of the AV, and the observation about the first location generated by the second AV, identifying a second location that is different from the first location;
   based upon the second location being identified, autonomously travelling to the second location rather than the first location and stopping at the second location in order for the passenger to enter the AV or for the passenger to exit the AV;
   detecting that the passenger has entered the AV or exited the AV; and
   upon detecting that the passenger has entered the AV or exited the AV, navigating away from the second location.

9. The method of claim 8, wherein the second location is identified based further upon traffic data that is indicative of current or predicted traffic at the first location and the second location.

10. The method of claim 9, wherein the second location is identified based further upon weather data that is indicative of current or predicted weather at the first location and the second location.

11. The method of claim 10, wherein the second location is identified based further upon historical successes and failures of passenger pick-ups and drop-offs at the first location and the second location.

12. The method of claim 11, wherein a cost function is employed to identify the second location, and further wherein a loss contemplated in the cost function is based upon a distance between the first location and the second location.

13. The method of claim 8, wherein the computer-readable content comprises an age of the passenger.

14. The method of claim 8, wherein the second location corresponds to the AV being in a double-parked condition.

15. A computer-readable storage medium onboard an autonomous vehicle (AV), wherein the computer-readable storage medium comprises instructions that, when executed by a processor, cause the processor to perform acts comprising:
   receiving a first location that identifies where the AV is to temporarily cease moving in order for a passenger to enter the AV or for the passenger to exit the AV, wherein the first location is specified in a ride request for the passenger;
   subsequent to receiving the first location and at a first time, receiving an observation about the first location generated by a second AV when the second AV travelled past the first location, where the second AV generated the observation at a second time that is prior to the first time, where the second time is within a predefined threshold amount of time from the first time, and further where the observation indicates that the first location will be undesirable to pick up or drop off a passenger at a scheduled pickup or drop off time;
   based upon a sensor signal output by a sensor system of the AV and the observation about the first location generated by the second AV, identifying a second location that is different from the first location;
   based upon the second location being identified, autonomously travelling to the second location rather than the first location and stopping at the second location in order for the passenger to enter the AV or for the passenger to exit the AV;
   detecting that the passenger has entered the AV or exited the AV; and
   upon detecting that the passenger has entered the AV or exited the AV, navigating away from the second location.

16. The computer-readable storage medium of claim 15, wherein the second location is identified based further upon traffic data that is indicative of current or predicted traffic at the first location and the second location.

17. The computer-readable storage medium of claim 16, wherein the second location is identified based further upon weather data that is indicative of current or predicted weather at the first location and the second location.

18. The computer-readable storage medium of claim 17, wherein the second location is identified based further upon historical successes and failures of passenger pick-ups and drop-offs at the first location and the second location.

19. The computer-readable storage medium of claim 15, wherein the second location is identified based further upon computer-readable content included in a profile of the passenger.

20. The computer-readable storage medium of claim 15, wherein the AV is double-parked when picking up or dropping off the passenger at the second location.

* * * * *